(12) United States Patent
Bushey et al.

(10) Patent No.: US 9,776,382 B2
(45) Date of Patent: Oct. 3, 2017

(54) MULTIPLE LAYER SURFACE COVERING

(76) Inventors: Richard D. Bushey, Kenosha, WI (US); Bret L. Bushey, Caledonia, WI (US)

(*) Notice: Subject to any disclaimer, the term of this patent is extended or adjusted under 35 U.S.C. 154(b) by 595 days.

(21) Appl. No.: 13/032,932

(22) Filed: Feb. 23, 2011

(65) Prior Publication Data

US 2011/0206901 A1 Aug. 25, 2011

Related U.S. Application Data

(60) Provisional application No. 61/307,697, filed on Feb. 24, 2010.

(51) Int. Cl.
| | |
|---|---|
| *B32B 27/30* | (2006.01) |
| *B32B 3/08* | (2006.01) |
| *B32B 3/14* | (2006.01) |
| *B32B 3/30* | (2006.01) |
| *B32B 5/32* | (2006.01) |
| *B32B 7/02* | (2006.01) |
| *B32B 7/12* | (2006.01) |

(Continued)

(52) U.S. Cl.
CPC ............ *B32B 27/304* (2013.01); *B32B 3/085* (2013.01); *B32B 3/14* (2013.01); *B32B 3/30* (2013.01); *B32B 5/32* (2013.01); *B32B 7/02* (2013.01); *B32B 7/12* (2013.01); *B32B 27/08* (2013.01); *B32B 27/20* (2013.01); *C09J 7/0296* (2013.01); *B32B 2250/22* (2013.01); *B32B 2250/24* (2013.01); *B32B 2266/0235* (2013.01); *B32B 2307/4026* (2013.01); *B32B 2471/00* (2013.01); *B32B 2605/12* (2013.01); *C09J 2201/162* (2013.01); *C09J 2400/243* (2013.01); *C09J 2427/006* (2013.01); *Y10T 428/24355* (2015.01); *Y10T 428/24438* (2015.01)

(58) Field of Classification Search
CPC .. B32B 3/085; B32B 3/30; B32B 5/32; B32B 7/02; B32B 7/12; B32B 27/08; B32B 27/20; B32B 27/304; B32B 3/14; B32B 2250/22; B32B 2250/24; B32B 2266/0235; B32B 2307/4026; B32B 2471/00; B32B 2605/12; Y10T 428/24438; Y10T 428/24355; C09J 7/0296; C09J 2201/162; C09J 2400/243; C09J 2427/006
USPC ................................................. 428/141, 151
See application file for complete search history.

(56) References Cited

U.S. PATENT DOCUMENTS

| | | | |
|---|---|---|---|
| 2,250,482 A | 7/1941 | Harshberger | |
| 3,969,868 A * | 7/1976 | Bainter et al. ................ 428/201 |

(Continued)

OTHER PUBLICATIONS

"Work Surface Matting", Pandel, http://www.pandel.com/index.php?m_oem, May 24, 2011.

(Continued)

*Primary Examiner* — Nathan Van Sell
(74) *Attorney, Agent, or Firm* — Boyle Fredrickson, S.C.

(57) ABSTRACT

A multi-layer surface covering includes at least a first and a second layer made of a polyvinyl chloride material, each of the two layers having a different density. One of the two layers includes a pigment such that the layer resembles teak. A surface of the colored layer is at least partly abraded to resemble a wood grain. The surface covering may additionally include grooves cut into the surface to resemble individual wood planks. The grooves additionally provide traction and drainage of liquid from the surface to an edge of the covering.

10 Claims, 5 Drawing Sheets

(51) Int. Cl.
    *B32B 27/08*    (2006.01)
    *B32B 27/20*    (2006.01)
    *C09J 7/02*     (2006.01)

(56) References Cited

U.S. PATENT DOCUMENTS

| | | | |
|---|---|---|---|
| 4,275,540 A * | 6/1981 | Keller | 52/314 |
| 6,811,628 B1 | 11/2004 | Reid et al. | |
| 7,081,291 B2 * | 7/2006 | Courtoy et al. | 428/158 |
| 7,090,910 B2 * | 8/2006 | Courtoy et al. | 428/158 |
| 7,578,251 B1 | 8/2009 | Gribble | |
| 7,617,791 B2 | 11/2009 | Gribble | |
| 2004/0229000 A1 * | 11/2004 | Khandpur et al. | 428/41.3 |
| 2009/0056257 A1 * | 3/2009 | Mollinger et al. | 52/314 |
| 2009/0098357 A1 * | 4/2009 | Bergtold et al. | 428/218 |

OTHER PUBLICATIONS

"Anti-Fatigue Mats & Matting", Pandel, http://www.pandel.com/index.php?m=products&s=antifatigue&d=Anti-Fatigu . . . , May 24, 2011.
"Fatigue Fighter II ½"", Product Specification Sheet, Pandel, Aug. 7, 2008.
"Fatigue Fighter 3 ⅝"", Product Specification Sheet, Pandel, Aug. 7, 2008.
"SeaDek Swim Platforms", SeaDek Marine Products, http://www.seadek.com/Page_0_swimplatforms.html?gclid=CKK4ue22gKk . . . , May 24, 2011.
"Flexiteek—the World Class Environmental Teak Deck Alternative", http://www.flexiteek.com, May 25, 2011.
"The Ultimate Decking Solution", Nu Teak Decking, http://www.nuteak.com/?gclid=COfY3prkg6kCFQHsKgod6whbTQ, May 25, 2011.

* cited by examiner

MULTIPLE LAYER SURFACE COVERING

CROSS-REFERENCE TO RELATED APPLICATIONS

This application claims priority to U.S. Provisional Patent application Ser. No. 61/307,697 filed on Feb. 24, 2010, the entirety of which is hereby incorporated by reference.

FIELD OF THE INVENTION

The invention relates generally to surface coverings, and in particular, to a flexible, multiple layer covering for a surface.

BACKGROUND AND SUMMARY OF THE INVENTION

As is known, various coverings have been developed to cover user-desired surfaces for both protective and aesthetic reasons. For example, flooring materials such as carpeting or hardwood planks are often used for covering a supporting surface. Surface coverings may be a natural material, such as stone or wood, or a manufactured product, such as laminate, ceramic or vinyl. Many factors enter in the decision for selecting a specific material for any given project. These factors include, but are not limited to, the cost and appearance of the product, the surface to be covered, and the conditions to which the surface will be subjected. Design trends can also impact the selection process.

Natural hardwood floors are currently a desirable flooring material. Hardwood floors provide durability and a desirable appearance. Certain hardwoods, such as teak, are additionally desirable for outdoor use due to its weather resistance properties. However, hardwood floors are not without their drawbacks. For example, hardwood flooring is relatively expensive, heavy, and complicated to install. In contrast, vinyl flooring is relatively inexpensive, lightweight, and easy to install. Despite these advantages, the appearance of vinyl flooring may not be as desirable as, for example, hardwood flooring. Thus, it is highly desirable to provide a floor covering material having the benefits of a vinyl flooring product, yet incorporating the durability and a desirable appearance of a hardwood flooring product.

Therefore, it is a primary object and feature of the present invention to provide a multiple layer surface covering that is durable and aesthetically pleasing.

It is a further object and feature of the present invention to provide a multiple layer surface covering that, when used as a floor covering, provides a surface which is both non-skid and cushioned.

It is a still further object and feature of the present invention to provide a multiple layer surface covering that is simple to install and inexpensive to manufacture.

According to one embodiment of the present invention, a surface covering includes a first layer having a first surface, a second surface, and a density. The surface covering also includes a second layer having a first surface, bonded to the second surface of the first layer, a second surface at least partly abraded, and a density. The density of the first layer differs from the density of the second layer. The second layer has a thickness and may further include a plurality of parallel grooves extending substantially through the thickness.

As another aspect of the invention, the surface covering may include a third layer, having a first surface and a second surface. The third layer may be a pressure sensitive adhesive which is applied to the first surface of the first layer. The density of the first layer may be greater than the density of the second layer, wherein the density of the first layer is in the range of 60 to 80 pounds per cubic foot, and the density of the second layer is in the range of 30 to 50 pounds per cubic foot.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE PREFERRED EMBODIMENTS

The various features and advantageous details of the subject matter disclosed herein are explained more fully with reference to the non-limiting embodiments described in detail in the following description.

Referring to FIGS. 1-3 and 5-7, a surface covering material in accordance with the present invention is generally designated by the reference numeral 10. According to a first embodiment of the invention, the surface covering material 10 includes a first layer 20 having a first surface 22, a second surface 24, and a density. A second layer 30 also has a first surface 32, a second surface 34, and a density. Each of the first and second layers, 20 and 30 respectively, is preferably fabricated from a vinyl compound, the first layer 20 being of different composition than the second layer 30. The first surface 32 of the second layer 30 is joined to the second surface 24 of the first layer 20, preferably by co-extrusion. More specifically, it is contemplated for the first layer 20 to be initially dispensed according to a desired form factor and partially cured. The second layer 30 is subsequently dispensed onto the first layer 20 and within the desired form factor. The two layers are then cured together, forming a chemical bond between the first layer 20 and the second layer 30.

The desired form factor for the surface covering material 10 is determined by the application requirements. According to one embodiment of the invention, the surface covering material 10 has a front end 12, a rear end 14, and opposite side walls 16. The surface covering material 10 may form, for example, square or rectangular tiles, having a width, W, and a length, L. Optionally, the tiles may take any desirable shape. As still another option, the surface covering material 10 may be continuously extruded as a sheet of material. Tiles having a desired shape may either be cut from the extruded sheet, or the extruded surface covering material 10 may be received onto a spool to form a roll of material.

The first layer 20 is preferably an expanded polyvinyl chloride (PVC) material including about 45 percent filler and having a density in the range of 30-50 pounds per cubic foot (pcf). The first layer 20 may be, for example, fabricated from the component materials indentified in Table 1 below. The PVC resin is preferably dispersion grade, suspension grade, or a combination thereof. The primary plasticizer is preferably a general purpose plasticizer such as phthalate esters, adipate esters, terephthalate esters, or a combination thereof. The secondary plasticizer is preferably an extender plasticizer such as benzyl phthalate esters, glycol dibenzoates, chlorinated olefins/paraffins, or a combination thereof. The heat stabilizer is an organo-metallic stablizer preferably based on calcium, barium, zinc, tin, or a combination thereof. The chemical blowing agent, such as azo dicarbonamide, and foaming activator is added to achieve the desired density range of 30-50 pcf for the first layer 20. A polymer-based foaming stabilizer is added to control vinyl expansion and sufficient pigment, organic or inorganic, is added to achieve the desired color, such as black, for the base or grout appearance of the finished product. The drying agent is preferably calcium oxide, aluminosilicates, organic anhydrides or a combination thereof. An inorganic filler, such as calcium carbonate, barium sulfate, fly ash (silicon oxide/calcium oxide), or a combination thereof is added to provide mass.

TABLE 1

Composition of first layer

| Material | Amount (parts) |
| --- | --- |
| PVC resin | 100 |
| Primary plasticizer | 40-70 |
| Secondary plasticizer | 0-25 |
| Heat stabilizer | 0-5 |
| Chemical blowing agent | sufficient to achieve 30-50 pcf density |
| Foaming stabilizer | 0-5 |
| Pigment | 0-10 |
| Drying agent | 0-5 |
| Filler | 0-200 |

The second layer 30 is preferably an expanded polyvinyl chloride (PVC) material including about 45 percent filler and having a density in the range of 60-85 pounds per cubic foot (pcf). The second layer 30 may, for example, be fabricated from the component materials, listed in Table 2 below. The PVC resin is preferably dispersion grade, suspension grade, or a combination thereof. The primary plasticizer is preferably a general purpose plasticizer such as phthalate esters, adipate esters, terephthalate esters, or a combination thereof. The heat stabilizer is an organo-metallic stablizer preferably based on calcium, barium, zinc, tin, or a combination thereof. The ultraviolet (UV) stabilizer protects against photodegradation and may have a chemistry based on benzophenone, benzotriazole, hindered amine, or a combination thereof. The chemical blowing agent, such as azo dicarbonamide, and foaming activator is added to achieve the desired density range of 60-85 pcf in the vinyl composition of the second layer 30. It is further contemplated that the second layer may achieve the desired density without the addition of the chemical blowing agent. Sufficient pigment, organic or inorganic, is added to achieve the desired color, such as teak, for the finished product. The drying agents are preferably calcium oxide, aluminosilicates, organic anhydrides, or a combination thereof. An inorganic filler, such as calcium carbonate, barium sulfate, fly ash (silicon oxide/calcium oxide), or a combination thereof is added to provide mass.

TABLE 2

Composition of second layer

| Material | Amount (parts) |
| --- | --- |
| PVC resin | 100 |
| Primary plasticizer | 65-85 |
| Heat stabilizer | 0-5 |
| UV stabilizer | 0-2 |
| Chemical blowing agent | sufficient to achieve 60-85 pcf density |
| Pigment | sufficient to yield teak color |
| Drying agent | 0-5 |
| Inorganic filler | 0-200 |

Figure 9:
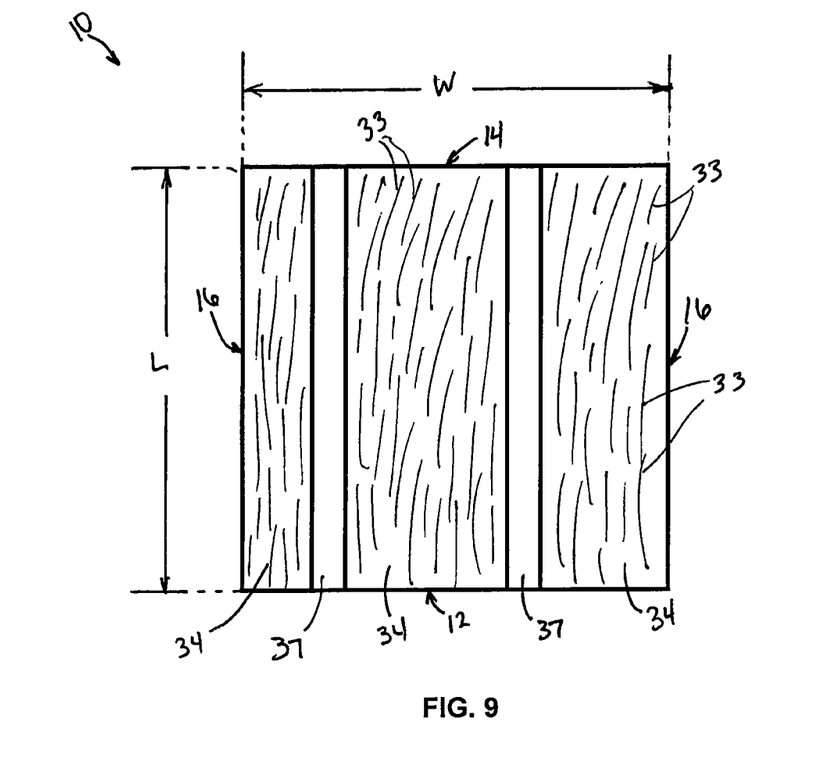
FIG. 9 is top plan view of a fifth embodiment of the multiple layer surface covering of the present invention.
Figure 10:
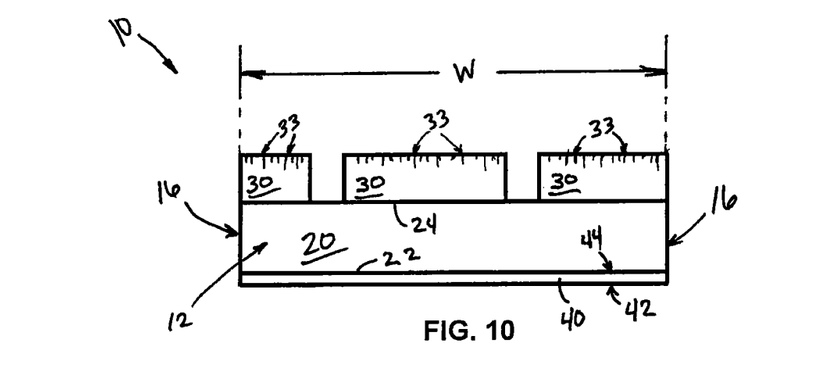
FIG. 10 is front elevational view of the multiple layer surface covering in FIG. 9.

According to one embodiment of the present invention, illustrated in FIGS. 9 and 10, the second surface 34 of the second layer 30 may include a plurality of markings such that the second surface 34 resembles a wood finish. Preferably, the second surface 34 is at least partly abraded, for example by sanding, to produce multiple narrow channels 33 extending generally in the same direction to simulate a wood grain. Additionally, grooves 37 may be cut into the second surface 34 of the second layer 30 extending substantially through the thickness of the second layer 30 and being generally wider than the channels 33. The grooves 37 may give the appearance of wood boards or grout lines in accordance with the desired appearance of the surface covering material 10.

Figure 1:
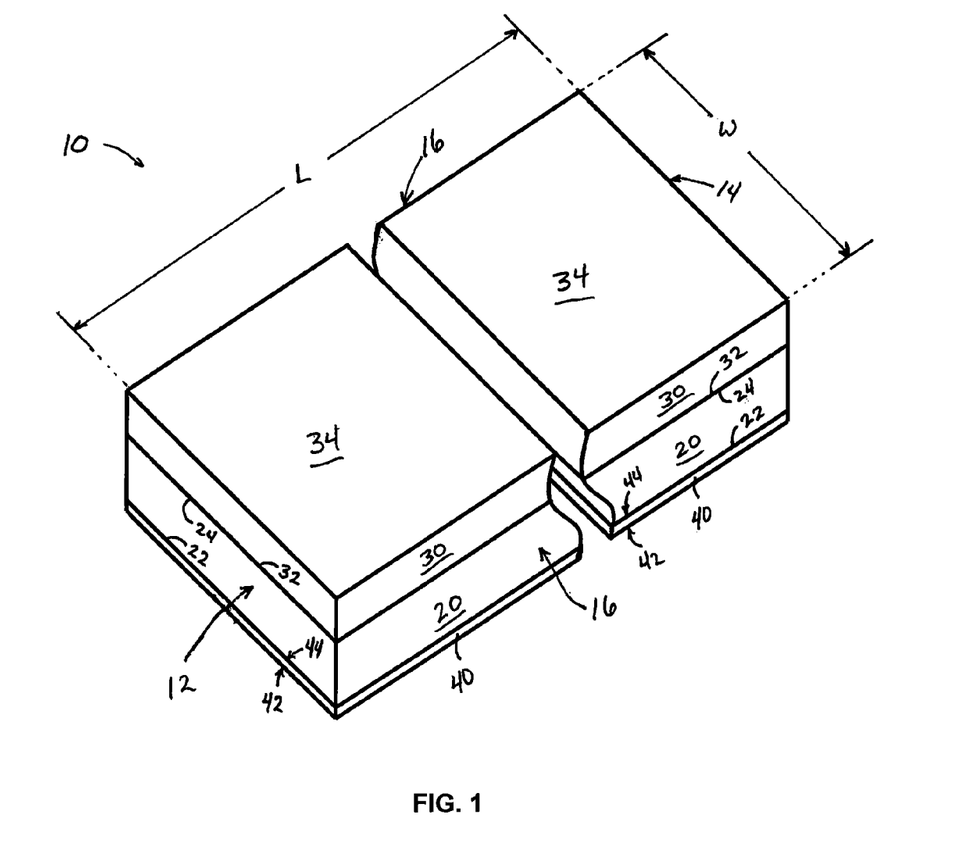
FIG. 1 is a perspective view of a multiple layer surface covering in accordance with a first embodiment of the present invention.
Figure 2:
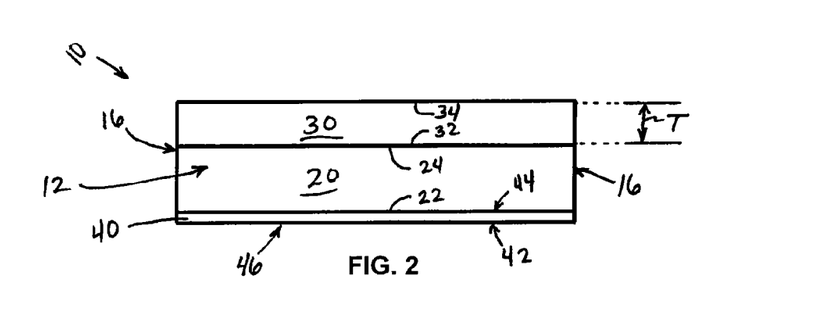
FIG. 2 is front elevational view of the multiple layer surface covering of FIG. 1.
Figure 3:
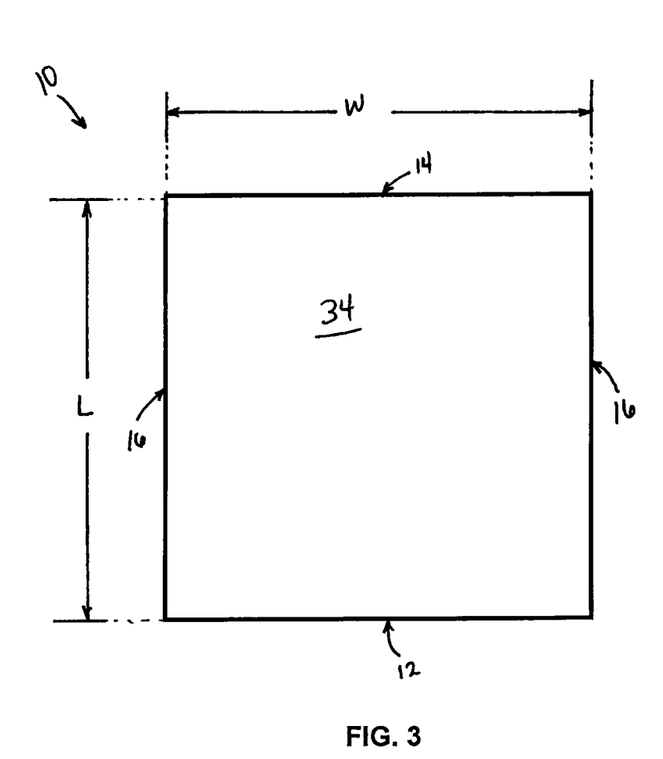
FIG. 3 is top plan view of the multiple layer surface covering of FIG. 1.
Figure 4:
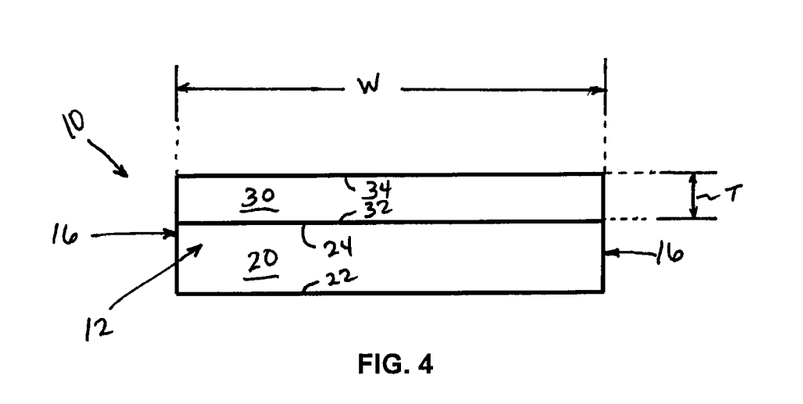
FIG. 4 is front elevational view of a second embodiment of the multiple layer surface covering of the present invention.
Figure 5:
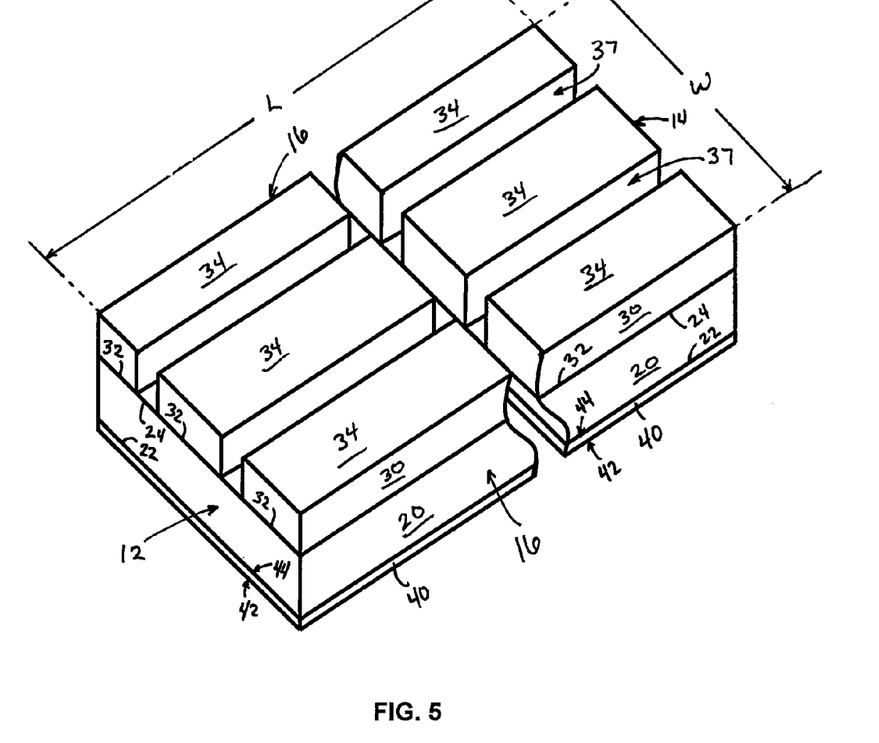
FIG. 5 is a perspective view of a third embodiment of the multiple layer surface covering of the present invention.
Figure 6:
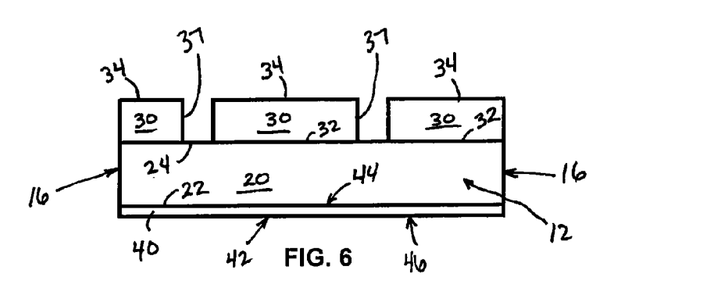
FIG. 6 is front elevational view of the multiple layer surface covering in FIG. 5.
Figure 7:
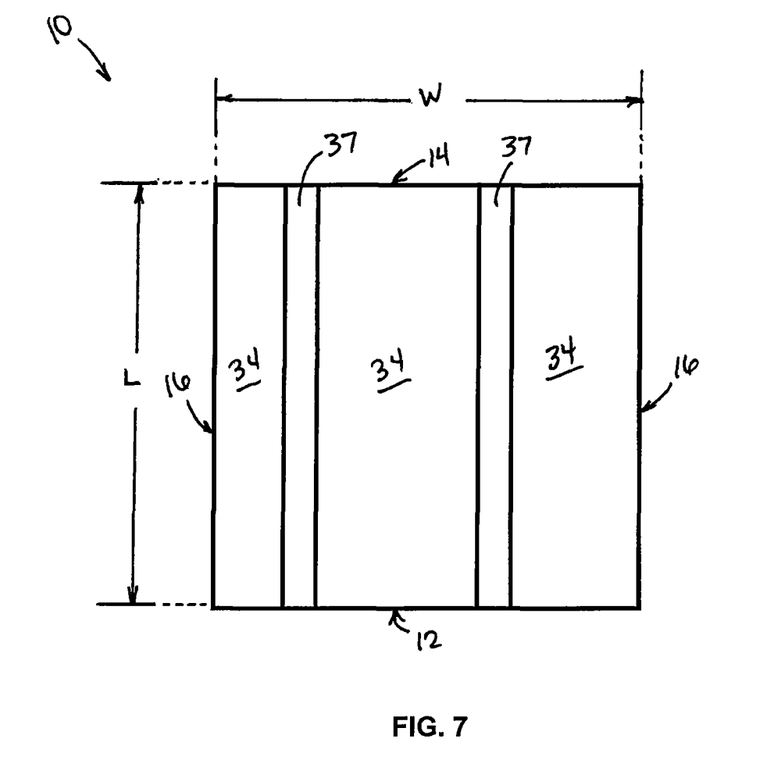
FIG. 7 is top plan view of the multiple layer surface covering in FIG. 5.
Figure 8:
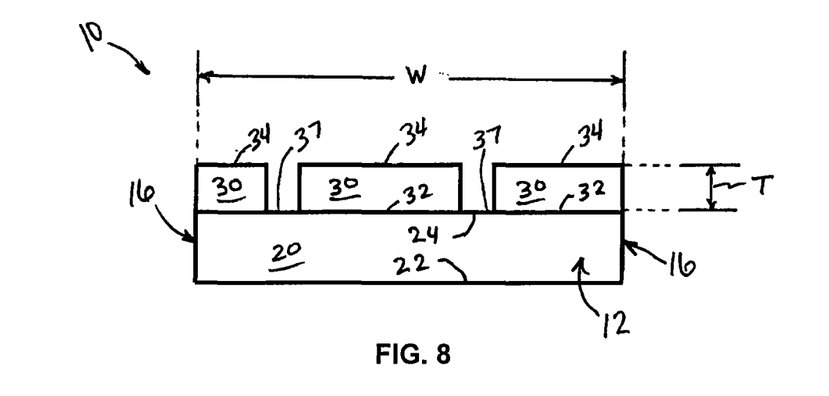
FIG. 8 is front elevational view of a fourth embodiment of the multiple layer surface covering of the present invention.

As seen in FIGS. 4 and 8, the surface covering material 10 may include only the first and second layers, 20 and 30 respectively. In another embodiment, illustrated in FIGS. 1-3 and 5-7, the surface covering material 10 may further include a third layer 40. The third layer 40 is preferably a pressure sensitive adhesive (PSA) applied to the first surface 32 of the first layer 20. The PSA may additionally be covered with a removable backing 46 to prevent the adhesive from sticking to objects while transporting the surface covering material 10.

It is contemplated that the surface covering material 10 may be configured to be delivered in any form known in the art. For example, the surface covering material 10 may be formed as tiles, having varying widths, W, and lengths, L. Optionally, the surface covering material 10 may be wound onto a roll of material for covering larger surfaces such as the floor of a room or deck of a boat.

In operation, the surface covering material 10 is selected for use on a particular surface according to desired properties. The surface covering material 10 may either be cut to the size of the space to be covered, if provided on a roll, or the required number of tiles may be selected to cover the space. If the surface covering material 10 includes a third layer 40 composed of a PSA, the removable backing 46 may be peeled off the third layer 40 and the surface covering material 10 pressed onto the floor. Optionally, glue or another adhesive may be applied to the floor directly and the surface covering material 10 positioned and pressed onto the floor.

The surface covering material 10 may be used as a floor covering, for example, on boats, behind bars, or in other areas where a durable, non-slip, and water resistant material may be desirable. The multiple layer construction of the surface covering material 10 combines a durable second layer 30 with a padded first layer 20. The second layer 30 includes, for example, UV stabilizer to better maintain its original appearance in the presence of light and particularly sunlight, for example, on the deck of a boat. The channels 33 and grooves 37 on the second surface 34 of the second layer 30 provide a wood grain appearance and, in coordination with the pigment may provide the appearance of a teak finish. The simulated teak finish may be provided at a substantially reduced cost to using actual teak. Further, the channels 33 and grooves 37 act to provide traction, such that the second surface 34 of the second layer 30 has a non-slip finish. The non-slip finish on the second surface 34 is a desirable feature in wet locations, such as on the deck of a boat or behind a bar. The first layer 20 also provides cushioning, making the surface covering material 10 more comfortable to walk or stand on.

The surface covering material 10 may similarly be used as a wall or counter-top covering. The surface covering material 10 may be applied either with the PSA, if included, or by another adhesive. The surface covering material 10 may be selected to cover either the wall or a counter-top to provide the appearance of wood paneling. The surface covering material 10 may also be selected for use based on other properties such as water resistance or easy cleanup.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A surface covering material, comprising:
    a first layer having first and second ends, a first surface, a second surface, and a density; and
    a second layer having a first end generally co-planar with the first end of the first layer, a second end generally co-planar with the second end of the first layer, a length defined between the first and second ends of the second layer, a first surface bonded to the second surface of the first layer, a second surface at least partly abraded, and a density, the second layer having:
        a first sidewall formed therein, the first sidewall extending between and being perpendicular to the first and second surfaces of the second layer;
        a second sidewall formed in the second layer at a location spaced from the first sidewall, the second sidewall extending between and being perpendicular to the first and second surfaces of the second layer;
        a third sidewall formed therein, the third sidewall extending between and being perpendicular to the first and second surfaces of the second layer; and
        a fourth sidewall formed in the second layer at a location spaced from the third sidewall, the fourth sidewall extending between and being perpendicular to the first and second surfaces of the second layer;
    wherein:
        a first groove is defined by the first and second sidewalls formed in the second layer, the first groove extending along a first axis from the first end of the second layer to the second end of the second layer along the entirety of the length of the second layer;
        a second groove is defined by the third and fourth sidewalls formed in the second layer, the first groove extending along a second axis generally parallel to the first axis from the first end of the second layer to the second end of the second layer alone the entirety of the length of the second layer;
        the second surface of the first layer is exposed and communicates with the first and second grooves;
        the first and second sidewalls in the second layer lie in parallel planes;
        the density of the first layer differs from the density of the second layer; and
        the bonded first and second layers are configured to be movable between a first rolled configuration wherein the bonded first and second layers are rolled upon themselves and a second flat configuration.

2. The surface covering material of claim 1 further comprising a third layer having a first surface and a second surface, wherein the third layer is applied to the first surface of the first layer.

3. The surface covering material of claim 2 wherein the third layer is a pressure sensitive adhesive.

4. The surface covering material of claim 1 wherein the first layer has a density in the range of 30 to 50 pounds per cubic foot.

5. The surface covering material of claim 1 wherein the second layer has a density in the range of 60 to 85 pounds per cubic foot.

6. The surface covering material of claim 1 wherein the density of the second layer is greater than the density of the first layer.

7. The surface covering material of claim 1 wherein the second layer is bonded to the first layer by co-extrusion.

8. A multilayer surface covering material, comprising:
    a first layer having first and second planar ends, first and second opposite surfaces and a composition including:
        a polyvinyl chloride resin,
        a plasticizer, and
        a chemical blowing agent in sufficient quantity such that the first layer has a density in the range of 30 to 50 pounds per cubic foot; and
    a second layer having a first end generally co-planar with the first end of the first layer, a second end generally co-planar with the second end of the first layer, a length defined between the first and second ends of the second layer, a first surface bonded to the second surface of the first layer, a second surface treated to resemble a wood grain, a density in the range of 60 to 85 pounds per cubic foot, and a composition including:
a polyvinyl chloride resin, and
a plasticizer;
wherein:
the second layer includes:
a first sidewall formed therein, the first sidewall extending between and being perpendicular to the first and second surfaces of the second layer;
a second sidewall formed in the second layer at a location spaced from the first sidewall, the second sidewall extending between and being perpendicular to the first and second surfaces of the second layer;
a third sidewall formed therein, the third sidewall extending between and being perpendicular to the first and second surfaces of the second layer; and
a fourth sidewall formed in the second layer at a location spaced from the third sidewall, the fourth sidewall extending between and being perpendicular to the first and second surfaces of the second layer;
the first and second sidewalls in the second layer defining a first groove therebetween, the first groove extending along a first axis from the first end of the second layer to the second end of the second layer along the entirety of the length of the second layer;
the third and fourth sidewalls in second layer defining a second groove therebetween, the second groove extending along a second axis generally parallel to the first axis from the first end of the second layer to the second end of the second layer along the entirety of the length of the second layer;
a portion of the second surface of the first layer is exposed and communicates with the first and second grooves;
the first and second sidewalls in the second layer lie in parallel planes; and
the bonded first and second layers are configured to be movable between a first rolled configuration wherein the bonded first and second layers are rolled upon themselves and a second flat configuration.

9. The multilayer surface covering material of claim 8 wherein the second surface of the second layer includes a plurality of abrasions in the surface.

10. The multilayer surface covering material of claim 8 further comprising a pressure sensitive adhesive applied to the first surface of the first layer.

* * * * *